No. 663,342. Patented Dec. 4, 1900.
L. HARDY.
SAD IRON HEATER.
(Application filed Sept. 19, 1900.)
(No Model.)
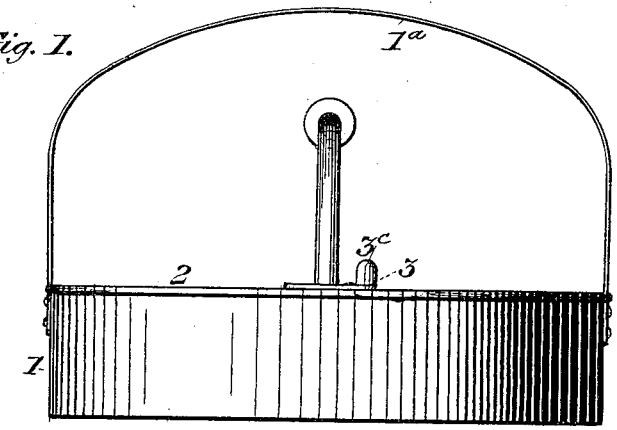
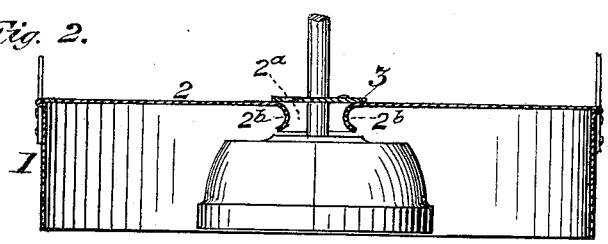
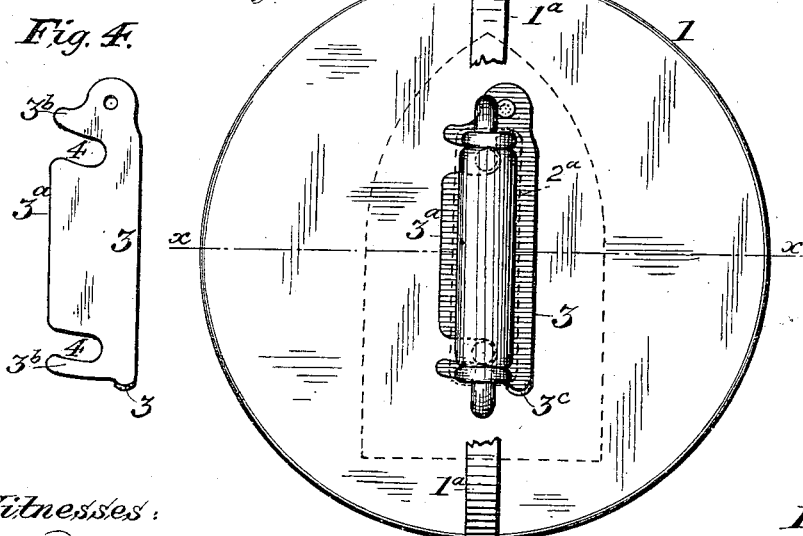
Witnesses:
T. C. Brecht
M. Jackson
Inventor:
Louisa Hardy.
By Edson Bros.
Attorneys

United States Patent Office.

LOUISA HARDY, OF CHICAGO, ILLINOIS.

SAD-IRON HEATER.

SPECIFICATION forming part of Letters Patent No. 663,342, dated December 4, 1900.

Application filed September 19, 1900. Serial No. 30,477. (No model.)

*To all whom it may concern:*

Be it known that I, LOUISA HARDY, a citizen of the United States, residing at Chicago, in the county of Cook and State of Illinois, have invented certain new and useful Improvements in Sad-Iron Heaters; and I do hereby declare the following to be a full, clear, and exact description of the invention, such as will enable others skilled in the art to which it appertains to make and use the same.

My invention relates to certain improvements in sad-iron heaters. It has for its object to provide for the ready and impromptu heating of the iron; also, to simplify construction, lessen cost of manufacture, and otherwise promote facility, convenience, and expedition in the use of the same.

It consists, generally stated, of a heater or closure adapted to provide for the exclusion of the sad-iron handle or that part thereof grasped by the hand from the action of the heat, and of details of construction, substantially as hereinafter more fully disclosed, and specifically pointed out by the claims.

In the accompanying drawings, illustrating the preferred embodiment of my invention, Figure 1 is a side view. Fig. 2 is a sectional elevation. Fig. 3 is a plan view thereof. Fig. 4 is a detail view of the lid.

Latitude is allowed herein as to details, as they may be changed or varied at will without departing from the spirit of my invention and the same yet remain intact and be protected.

In carrying out my invention I provide a heater 1, with its closure or cover 2 suitably adapted to be placed over and lifted from the sad-iron as occasion may require by means, preferably, of a rigid handle $1^a$. Said closure or cover 2 has an oblong opening $2^a$, as indicated by the inner dotted lines of Fig. 3, preferably at its center, to permit and facilitate the passage therethrough of the sad-iron handle. In order to effect the guiding of the sad-iron handle through said opening and its ready insertion therein, the lateral edges of the metal at each side of the slit, initially produced in said cover or closure in forming said opening, is bent or depressed downward and away from each other, whereby inward rolled or convex flanges or guides $2^b$ are provided thereon, as shown.

The cover or closure 2 has pivoted or hinged to its upper surface, at one side of its opening, a supplemental closure or lid 3, having an elongation, as $3^a$, so constructed as to cause said elongation to pass under the hand-grasped portion of the handle and close said opening, and thus exclude said handle-grasped portion from the action of the heat, preventing the same from becoming heated. Said lid 3 has notches 4, one near each end, at one side to receive the arms or vertical portions of the handle, providing projections $3^b$, which form extensions of said lid and aid in closing said opening $2^a$. Said lid also has a knob $3^c$ to provide for its convenient movement.

This invention, it will be seen, provides for the ready and expeditious heating of the iron, as well as fully utilizes the action of the heat upon the iron by being able to fully confine the heat in addition to avoiding the heating of the handle, as aforesaid.

Having thus fully described my invention, what I claim, and desire to secure by Letters Patent, is—

1. A sad-iron heater consisting of a closure or cover provided with downward-curved flanges or guides made out of the cover and forming a central opening therein, substantially as set forth.

2. A sad-iron heater, having a closure or cover provided with a central oblong opening and downward-curved flanges or guides, a supplemental closure or lid pivoted or hinged to the upper surface of the first-referred-to closure and having an elongation adapted to close said opening and fit under the hand-grasped portion of the iron-handle, substantially as specified.

In testimony whereof I affix my signature in presence of two witnesses.

LOUISA HARDY.

Witnesses:
LILLIAN M. WARD,
MAYME J. LORIMER.